(12) United States Patent
Davies

(10) Patent No.: US 7,831,474 B2
(45) Date of Patent: Nov. 9, 2010

(54) SYSTEM AND METHOD FOR ASSOCIATING AN UNVALUED SEARCH TERM WITH A VALUED SEARCH TERM

(75) Inventor: Winton Davies, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 290 days.

(21) Appl. No.: 11/262,012

(22) Filed: Oct. 28, 2005

(65) Prior Publication Data

US 2007/0100795 A1    May 3, 2007

(51) Int. Cl.
*G06Q 30/00*     (2006.01)
*G06F 17/30*     (2006.01)

(52) U.S. Cl. ............... 705/14.69; 705/14.71; 707/706; 707/758

(58) Field of Classification Search .............. 705/37, 705/14, 41.69, 14.71, 14.69, 14.72, 14.73, 705/14.41; 707/3, 4, 723, 758, 767, 706, 707/741
See application file for complete search history.

(56) References Cited

U.S. PATENT DOCUMENTS

| | | | | |
|---|---|---|---|---|
| 6,269,361 | B1 * | 7/2001 | Davis et al. ............... | 707/3 |
| 6,704,727 | B1 * | 3/2004 | Kravets .................... | 707/5 |
| 7,225,182 | B2 * | 5/2007 | Paine et al. ............... | 707/3 |
| 7,272,594 | B1 * | 9/2007 | Lynch et al. .............. | 707/3 |
| 2002/0099605 | A1 * | 7/2002 | Weitzman et al. ......... | 705/14 |
| 2002/0138528 | A1 * | 9/2002 | Gong et al. ............... | 707/530 |
| 2003/0126250 | A1 * | 7/2003 | Jhanji ....................... | 709/223 |
| 2005/0086206 | A1 * | 4/2005 | Balasubramanian et al. ... | 707/3 |
| 2005/0102270 | A1 * | 5/2005 | Risvik et al. .............. | 707/2 |
| 2005/0144065 | A1 * | 6/2005 | Calabria et al. ........... | 705/14 |
| 2005/0171932 | A1 * | 8/2005 | Nandhra .................... | 707/3 |
| 2006/0020607 | A1 * | 1/2006 | Patterson .................. | 707/100 |
| 2007/0088683 | A1 * | 4/2007 | Feroglia et al. ............ | 707/4 |

OTHER PUBLICATIONS

Author: Michael Wong, Title: How to Maximize Your Traffic with Goto.com, Published: Feb. 1999, pp. 1-5; link: http://www.thewritemarket.com/mcnn/index.php?mcnn=wong&title=How%20to%20Maximize%20Your%20Traffic%20with%20Goto.com.*

* cited by examiner

*Primary Examiner*—Greta L. Robinson
*Assistant Examiner*—I Uddin
(74) *Attorney, Agent, or Firm*—Seth H. Ostrow; Ostrow Kaufman LLP

(57) ABSTRACT

Methods and systems for associating an unbidded term with a bidded term and for pricing search terms. The method for associating an unbidded term with a bidded term comprises selecting a first set of search engine results for the unbidded term, selecting a second set of search engine results for the bidded second term, comparing the first and second sets, and associating the unbidded term with at least one bidded term based on the results of comparing. The method for assigning monetary values to search terms comprises receiving bids for a first term, deriving a similarity function between the first and second term and pricing the second term based upon the derived similarity function and the bid on the first term.

23 Claims, 9 Drawing Sheets

| Keywords | Category | Monthly Search Volume | Your Max Bid ($) | Pos. | Top 5 Max Bids | Est. Clicks* | Est. CPC* | Est. Cost* |
|---|---|---|---|---|---|---|---|---|
| mp3 players | mp3 | 538,397 | 2.01 | 1 | 2.00 1.33 1.01 0.54 0.53 · Bid Tool | 17,714 | 2.01 | 35,605.14 |
| portable mp3 players | mp3 | 240,254 | 2.01 | 1 | 2.00 0.48 0.48 0.39 0.38 · Bid Tool | 10,425 | 2.01 | 20,954.25 |
| best mp3 player | mp3 | 36,877 | 1.01 | 1 | 1.00 0.74 0.41 0.40 0.39 · Bid Tool | 433 | 1.01 | 437.33 |
| free mp3 player | mp3 | 5,833 | 0.28 | 1 | 0.27 0.26 0.25 0.17 0.15 · Bid Tool | 535 | 0.28 | 149.80 |
| free mp3 player download | mp3 | 2,347 | 0.16 | 1 | 0.15 0.15 0.12 0.11 0.10 · Bid Tool | 160 | 0.16 | 25.60 |

Estimated Monthly Cost: $57,172.12
Estimated Daily Cost: $1,905.74

FIG. 3
(Prior Art)

| Search Term | Search Results (URLs) | | | | Max Bid ($) |
|---|---|---|---|---|---|
| $k_1$ | $URL_1$ | $URL_2$ | ... | $URL_M$ | $2.00 |
| $k_2$ | | | | | $2.00 |
| $k_3$ | $URL_1$ $URL_2$ ... $URL_6$ www.winamp.com | | $URL_{10}$ ... | $URL_M$ www.cdw.com | $1.00 |
| ⋮ | | | | | |
| $k_{125}$ | $URL_1$ | $URL_2$ www.mp3.com | | $URL_{26}$ ... $URL_M$ | $0.25 |
| $k_N$ | $URL_1$ | $URL_2$ | ... | $URL_M$ | $0.10 |

FIG. 5

| Search Term | Search Results (URLs) | | | | Max Bid ($) |
|---|---|---|---|---|---|
| $k_u$ | $URL_1$ www.mp3.com | $URL_2$ | ... | $URL_7$ www.winamp.com | $URL_L$ www.cdw.com | |

FIG. 6

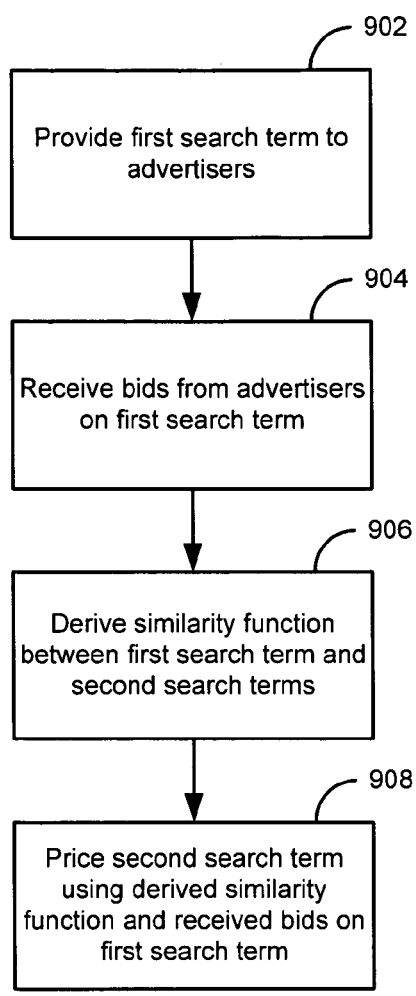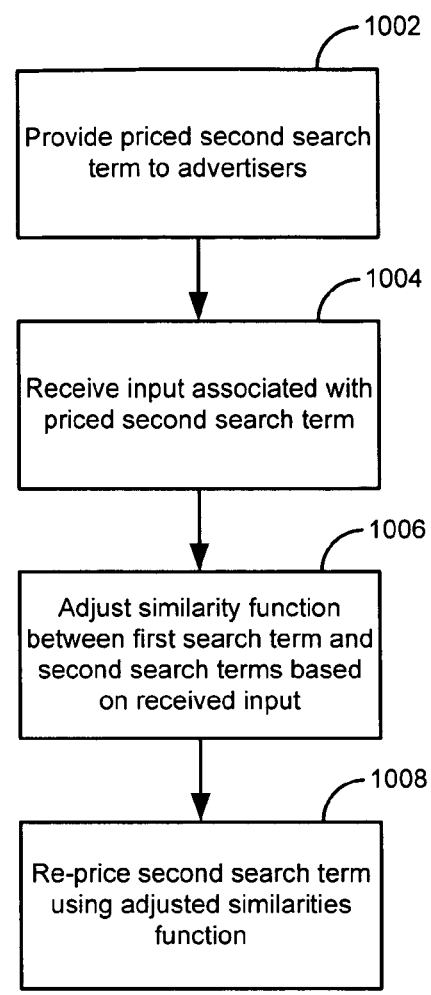
FIG. 9                    FIG. 10

SYSTEM AND METHOD FOR ASSOCIATING AN UNVALUED SEARCH TERM WITH A VALUED SEARCH TERM

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates generally to data processing systems and methods. More specifically, an embodiment of the invention relates to systems and methods for associating unvalued search terms with valued search terms and for assigning monetary values to search terms.

BACKGROUND OF THE INVENTION

The World Wide Web is a distributed database comprising billions of data records accessible through the Internet. Search engines are commonly used to search the information available on computer networks, such as the World Wide Web, to enable users to locate data records of interest. A typical prior art search engine 100 is shown in FIG. 1. Web pages, hypertext documents, and other data records from a source 101, accessible via the Internet or other network, are collected by a crawler 102. Crawler 102 collects data records from source 101, using various methods and algorithms. For example, crawler 102 may follow hyperlinks in a collected hypertext document to collect other data records. The data records retrieved by crawler 102 are stored in a database 108. Thereafter, these data records are indexed by an indexer 104. Indexer 104 builds a searchable index of the documents in database 108. Common prior art methods for indexing may include inverted files, vector spaces, suffix structures, and hybrids thereof. For example, each web page may be broken down into words and respective locations of each word on the page. The pages are then indexed by the words and their respective locations. A primary index of the whole database 108 is then broken down into a plurality of sub-indices and each sub-index is sent to a search node in a search node cluster 106.

To use search engine 100, a user typically enters one or more search terms or keywords at a terminal 112, which are sent to a dispatcher 110. Dispatcher 110 compiles a list of search nodes in cluster 106 to execute the query and forwards the query to those selected search nodes. The search nodes in search node cluster 106 search respective parts of the primary index produced by indexer 104 and return sorted search results along with a document identifier and a score to dispatcher 110. Dispatcher 110 merges the received results to produce a final result set displayed to user 430 sorted by relevance scores. The relevance score is a function of the query itself and the type of document produced. Factors that affect the relevance score may include: a static relevance score for the document such as link cardinality and page quality, placement of the search terms in the document, such as titles, metadata, and document web address, document rank, such as a number of external data records referring to the document, on how deeply a certain data record is embedded in the document, and document statistics such as query term frequency in the document, global term frequency, and term distances within the document. For example, Term Frequency Inverse Document Frequency (TFIDF) is a statistical method that is suitable for evaluating how important a word is to a document. The importance increases proportionally to the number of times a word appears in the document but is offset by how common the word is in all of the documents in the collection.

Referring to FIG. 2, there is shown an example of a result set 120. As shown in the figure, in response to a query 122 for the search term "MP3 player" shown on the top of the figure, the search engine YAHOO! searched its web index and produced a plurality of results in the form of result set 120 displayed to a user. For brevity, only a first page of result set 120 is shown. Result set 120 includes two results 124e-f, each with a respective clickable hyperlink 126e-f, description 127e-f, and Internet addresses or uniform resource locator (URL) 128e-f for index data records that satisfy query 122.

In addition to displaying search results 124e-f sorted by a relevance score shown in FIG. 2, a search engine may display sponsored results 124a-c and 124g-j, which are listings paid for by web page operators such as advertisers. For example, the advertiser includes any physical or legal entity that arranges, either directly or indirectly, with the search engine operator or its representatives, for monetary value or otherwise, to have a commercial, a poster, a personal add, a classified add or any other kind of advertisement, to be delivered to the search engine user. The delivery may be effected through any type of communication channel and may include, for example, telephone, mobile phone, SMS, radio, television, the Internet, LAN and WAN, or e-mail. Such sponsored listings may be stored in database 108 or a separate database (not shown) and may be associated with a particular search term, as further discussed below. An advertiser agrees to pay an amount of money to the search engine operator, commonly referred to as the bid amount, in exchange for a prominent position of the advertiser's listings distinctly displayed at the top, bottom, or on the side in a set of search results that is generated in response to a user's input of a particular search term. A higher bid amount will result in a more prominent placement of the advertiser's listings in a set of sponsored search results. Advertisers adjust their bids or bid amounts to have some control over the position at which their search listings are presented in the sponsored search results. The sponsored system displays search listings having higher-value bids in a more prominent manner, including but not limited to a screen position, larger font, different color, various video effects, or combination thereof. For example, higher-value bids may also be placed on a side bar, as results 124g-j in FIG. 2. More prominent listings are seen by more users and are more likely to be clicked through, producing traffic of potential customers to the advertiser's web site.

Focusing on sponsored result 124a, each sponsor listing may include a clickable hyperlink title 126a, including anchor text "MP3 CD Walkman®," descriptive text 127a, and a uniform resource locator (URL) 128a. Search engine 100 may store such sponsor listings, each associated with an advertiser or a web page operator, in database 108.

Search engine operators have developed various tools suitable for use in sponsored systems to help the advertisers manage their bids and attract traffic. Such tools and methods are described, for example, in a commonly assigned U.S. patent application Ser. No. 10/372,637, filed Feb. 21, 2003 and entitled METHOD AND APPARATUS FOR DETERMINING A MINIMUM PRICE PER CLICK FOR A TERM IN AN AUCTION BASED INTERNET SEARCH, which is hereby incorporated by reference in its entirety. Referring to FIG. 3, there is shown an exemplary bidding tool 300, which may include keywords 302, categories 304, monthly (or any other time period) search volumes 306 for each search term, maximum bids 308, positions 310, top 5 max bids 312, estimated monthly clicks 314, estimated monthly cost-per-click (CPC) 316, and estimated monthly cost 318.

Keyword 302 is a term, such as a word, a phrase, or a description, that relates to advertiser's business and describes its products or services. The words "keyword," "term," "phrase," and "description" are used interchangeably herein. Category 304 defines a grouping of keywords that are similar in a particular way (e.g., product type). Monthly search volume 306 is a statistic indicating a number of monthly searches the advertiser can expect on a particular keyword based on historical data. Maximum bids 308 determine the maximum price the advertiser is willing to pay per click for a particular keyword. Positions 310 indicate the current position of the advertiser's listing in the search results based on the advertiser's max bid amount. Top 5 max bids 312 indicate the bid amounts for the top five bids on a particular keyword. Estimated monthly clicks 314 indicate the estimated number of total clicks the advertiser will receive from a keyword based on the advertiser's max bid. Estimated monthly CPC 316 indicates the advertiser's estimated average cost-per-click on a particular keyword based on the advertiser's max bid. Estimated monthly cost 318 indicates the advertiser's estimated total monthly cost on a particular keyword based on the estimated monthly clicks and estimated CPC.

Focusing on the search term "mp3 players" 302a, which belongs to category mp3 304a, an advertiser using a bidding tool 300 may observe that search term 302a has been searched for by YAHOO! users approximately 540,000 times in the preceding month, as indicated by the corresponding monthly search volume 306a. As further indicated by top five max bids 312a, top five maximum bid for search term 302a range from $0.53 to $2.00 per click. As further indicated by maximum bid 308, the advertiser must bid at least $2.01 for search term 302a to secure the most prominent placement of the advertiser's web site, among the sponsored search results. As further indicated by estimated clicks 314a, the most prominent placement position for search term 302a, may lead to approximately 18,000 clicks-through per month, with an associated monthly cost 318a for the advertiser of approximately $35,000.

Thus, when a user performs a search on a sponsored search engine, the sponsored results are conventionally sorted and displayed based, at least in part, on how much each advertiser has bid on the user's search term. Because different users will use different keywords to find the same information, it is important for an advertiser to bid on a wide variety of search terms in order to maximize the traffic to the advertiser's website. The methods and systems for identifying one or more alternative search terms for a particular search terms are disclosed in commonly assigned U.S. patent application Ser. No. 11/200,851, filed Aug. 10, 2005 and entitled SYSTEM AND METHOD FOR DETERMINING ALTERNATIVE SEARCH QUERIES, and in commonly assigned U.S. patent application Ser. No. 11/202,388, filed Aug. 10, 2005 and entitled ALTERNATIVE SEARCH QUERY PROCESSING IN A TERM BIDDING SYSTEM, both of which are hereby incorporated by reference in their entirety.

As a result of identifying alternative search terms, advertisers may attempt to place high bids on more than one search term to increase the likelihood that their websites will be seen as a result of a search for those alternative terms. For example, the advertiser may decide to place bids on all search terms 302a-e shown in FIG. 3. The better and more extensive an advertiser's list of search terms, the more traffic the advertiser will see. However, there are many similar search terms, and it may be too expensive for an advertiser to bid on every potentially relevant search term. Conversely, an advertiser may not appreciate that an uncommon phrase may generate a similar result set as a common keyword and therefore it may be cheaper for the advertiser to bid on the uncommon phrase instead of competing for a limited number of popular keywords. As a result, a search engine operator may not receive any revenue from searches performed using certain search terms for which there have been no bids.

Accordingly, there is a need for a system and method that would allow to associate unbidded search terms with search terms already bid upon by advertisers.

There is also a need for a system and method for delivering advertisements associated with bidded search terms to a search engine user in response to the user entering unbidded search terms.

There is further a need for a system and method for assigning monetary values to unbidded search terms.

SUMMARY OF THE INVENTION

This invention relates generally to data processing systems and methods, particularly, to systems and methods for associating data records, for example, search terms, and for assigning monetary values to search terms based on the associating. The systems and methods of the present invention are suitable for associating data records embodied in or transmitted over any existing or future medium, such as wireline, wireless, narrowband, or broadband networks, for example, the Internet, or any interactive media, for example, video-on-demand, podcasting, streaming video and audio, instant messaging, and/or voice messaging. The systems and methods of the present invention may be implemented on any suitable centralized or distributed computer hardware and/or software in various combinations. The systems and methods of the present invention are also suitable for various kinds of search engines, including search engines used by Internet users to find records of interest on the World Wide Web. The methods of the present invention may be embodied in a computer readable medium including computer executable instructions stored thereon.

In one aspect of the invention, a method for associating a first term with a second term is provided. Such terms may be any data records, such as keywords used to identify records of interest, including various kinds of electronic data records, such as text documents of various formats, e-mails, webpages, video and audio files, and any other data records. In operation, the method selects a first set of search engine results for the first term, selects a second set of search engine results for the second term, compares the first and second sets, and associates the first and the second terms based on the comparison. Based on the comparison, a monetary value may be assigned to the first term based on the monetary value assigned to the second term. In some embodiments, the first term may be received from the user and the second term may be associated with an advertisement, which is then communicated to the user based on the associating of the first and second terms. Such advertising may be communicated via various kinds of media, such as wireline and wireless telephone, radio, and TV systems, the Internet and e-mail, podcasting, instant messaging, and/or chat.

In another aspect of the invention, a method for associating a first term with a second term and a third term is provided. In operation, the method selects a first set of search engine results for the first term, selects a second set of search engine results for the second term, selects a third set of search engine results for the third term, compares the first set with the second set, compares the first set with the third set, associates the first term and the second term based on the comparison of the first set with the second set, and associates the first term and third term based on the comparison of the first set with the third set.

In yet another aspect of the present invention, a system for associating a first term with a second term is provided. The system includes a crawler effective to collect data records from an information source, a data store connected to the crawler and effective to store the data records, an indexer connected to the data store and effective to index the data records stored in the data store to produce indexed data records, a search node effective to search the indexed data records, a receiver effective to receive a query with an unbidded search term, and a processor connected to the receiver and the search node and effective to process the query and to associate the unbidded search term with a bidded search term.

In yet another aspect of the present invention, a method for assigning a monetary value to a search term is provided. In operation, the method provides at least one first search term to at least one advertiser, receives at least one bid from the advertiser on the first search term, derives a similarity function between the first term and at least one second term, and assigns a monetary value to the second term based at least in part on the bid and the similarity function. In one embodiment, the similarity function may be derived by selecting a first set of search engine results for the first term, selecting a second set of search engine results for the second term, comparing said first and second sets, and associating the first and second terms based on the comparing. The search engine results for either the first set or the second set or both may be ranked based on various factors, such as click-through rates, bidding rates, bid amounts, user-assigned weights. In another embodiment, the similarity function may be determined as an intersection of the result sets divided by a union of the result sets. In further embodiments, the similarity function may be determined by using a suitable statistical method, for example, Term Frequency Inverse Document Frequency (TFIDF) or cosine TFIDF functions. In further embodiments, the method may further adjust the similarity function based on the feedback received from either the advertiser or user or both. As the similarity function is adjusted, the monetary value assigned to the second term may also be adjusted. The feedback may include bidding rates, bid amounts, and any other suitable input providing additional information regarding the similarity between the terms. The method may also include statistically analyzing the feedback, using, for example, a regression analysis. This method may be suitable for monetizing search terms and any other suitable data records used to identify records of interest. In some embodiments, the first term and/or second term may be associated with an advertisement, which is then communicated to the user. Such advertising may be communicated via various kinds of media, such as wireline and wireless telephone, radio, and TV systems, the Internet and e-mail, podcasting, instant messaging, and/or chat.

In other aspects of the present invention, a system for assigning a monetary value to a search term is provided. The system includes a computer interface effective to provide at least one first search term to at least one advertiser; a receiver effective to receive at least one bid from the advertiser on the first search term, and a processor connected to the receiver and effective to derive a similarity function between the first term and at least one second term and to assign a monetary value to the second term based at least in part on the bid and the derived similarity function.

The foregoing description of the preferred embodiments has been provided only by way of introduction. Nothing in this section should be taken as a limitation of the claims, which define the scope of the invention.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is a diagram illustrating the process of bidding on search terms in accordance with the prior art.

FIG. 5 is a table illustrating a result set for bidded search terms in accordance with an embodiment of the invention.

FIG. 6 is a table illustrating a result set in accordance with an embodiment of the invention.

FIG. 9 is a process for assigning a monetary value to a search term in accordance with an embodiment of the invention.

FIG. 10 is a process for re-pricing a search term in accordance with an embodiment of the invention.

DETAILED DESCRIPTION OF THE PREFERRED EMBODIMENTS

Figure 1:
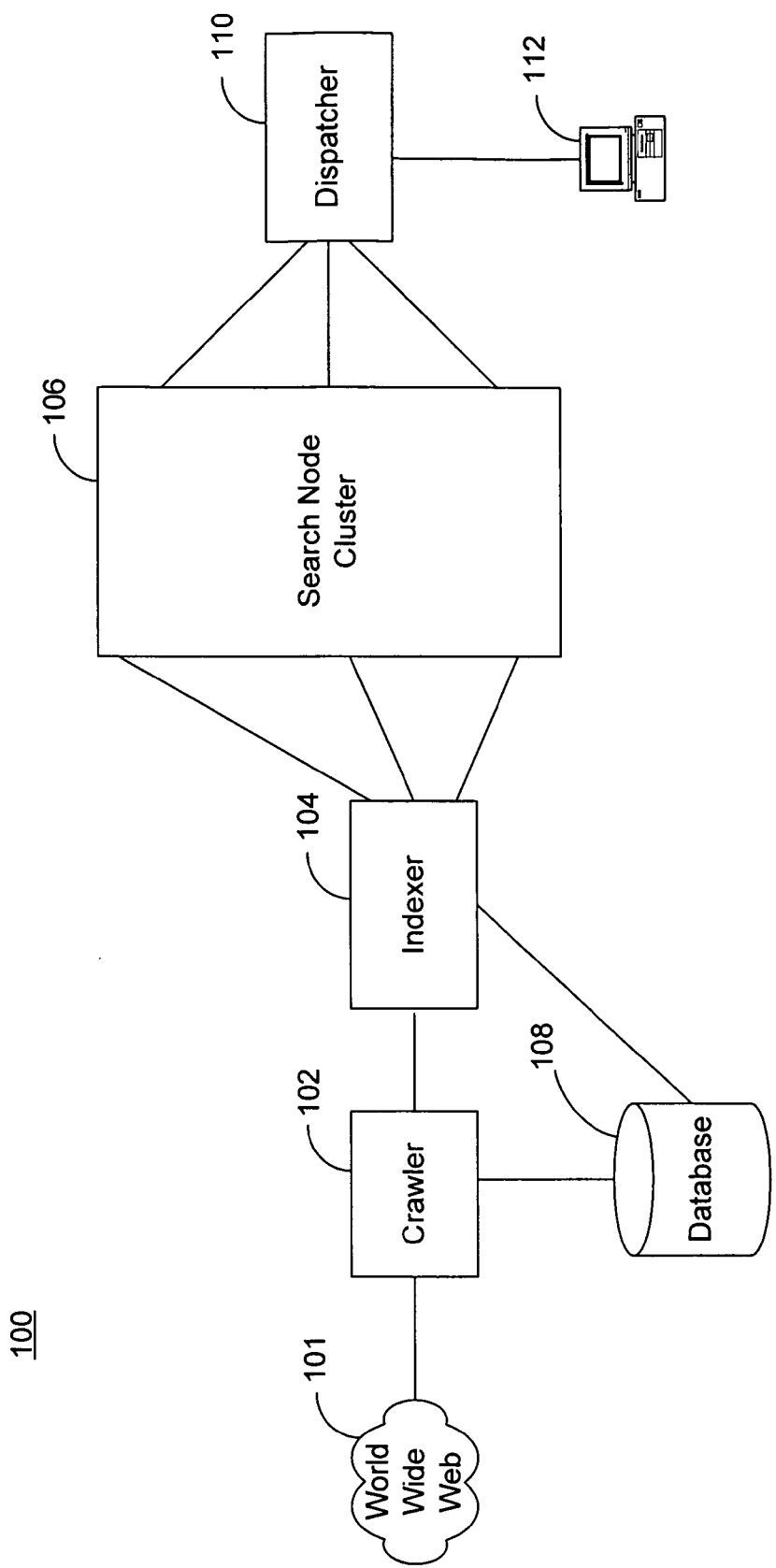
FIG. 1 is a block diagram illustrating a search engine architecture of the prior art.
Figure 2:
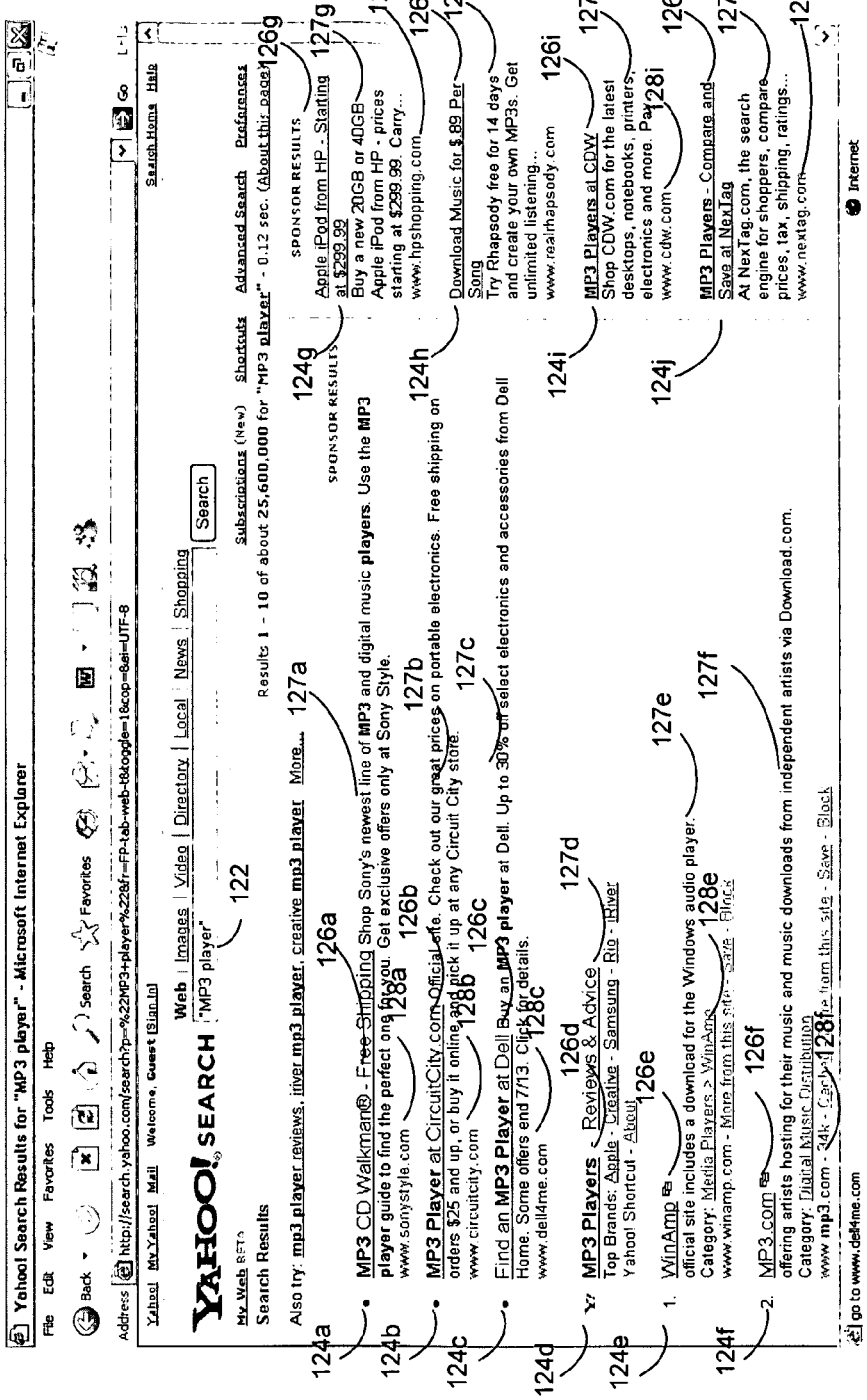
FIG. 2 is a diagram illustrating a result set in response to a search query in accordance with the prior art.
Figure 4:
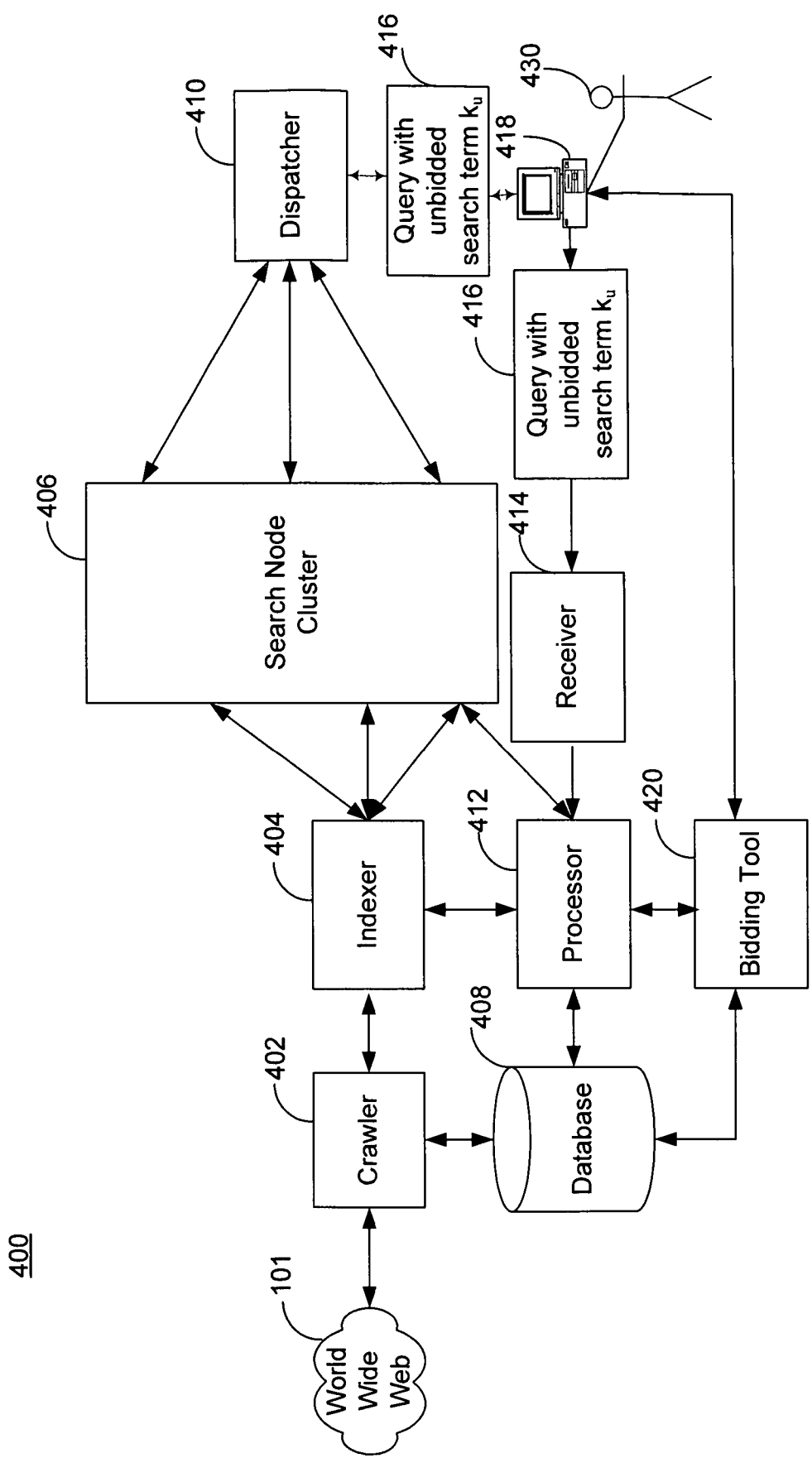
FIG. 4 is a system diagram illustrating a system for associating unbidded search terms with search terms already bid upon by advertisers in accordance with an embodiment of the invention.

Referring to FIG. 4, there is shown a system 400 for managing sponsored search listings and for associating similar keywords, search terms, or phrases, voice, video, or any other data input, in accordance with an embodiment of the invention. System 400 includes a receiver 414 for receiving a search query 416, which may include an unbidded search term $k_U$, from a user 430 using a user terminal 418. Receiver 414 is connected to a processor 412, which, in turn, is connected to an indexer 404, a search node cluster 406, and a database 408. Processor 412 may also receive search query 416 with unbidded search term $k_U$ from user terminal 418 via a dispatcher 410 and search node cluster 406.

A crawler 402 collects data records from source 101 and stores the collected data records in database 408. Thereafter, these data records are indexed by indexer 404. Indexer 404 builds a searchable index of the data records in database 408. To use search engine 400, user 430 typically enters one or more search terms or keywords, which are sent to dispatcher 410. Dispatcher 410 compiles a list of search nodes in cluster 406 to execute the query and forwards the query to those selected search nodes. The search nodes in search node cluster 406 search respective parts of the primary index produced by indexer 404 and return sorted search results along with a document identifier and a score to dispatcher 410. Dispatcher 410 merges the received results to produce a final result displayed to user 430 via user terminal 418 sorted by relevance scores. System 400 may include a bidding tool 420, which will be discussed in detail below, connected to database 108 and processor 412.

Referring now also to FIGS. 5 and 6, in order to associate unbidded search term $k_U$ 416 with at least one search term already bid upon by advertisers, processor 412 first determine the N topmost search bidded terms $k_1$-$k_N$ 502a-e. Such N topmost terms may be selected based upon various statistics, such as a frequency with which advertisers bid upon a particular term, the bid amount, or a frequency with which the term is searched. Variable N may range, for example, from 100,000 to 1,000,000 search terms. Processor 412 then searches database 408 and determines M topmost URLs 502 for each of terms $k_1$-$k_N$ 502a-e. Variable M may range, for example, from 100 to 1,000 URLs. FIG. 5 illustrates how processor 412 determines a result set {$URL_1$-$URL_M$} 504a for bidded term $k_1$, a result set {$URL_1$-$URL_M$} 504b for bidded term $k_2$, and so on until a result set {$URL_1$-$URL_M$} 504e is determined for $k_N$ 502e. Each result set {$URL_1$-$URL_M$} 504 may be determined using various methods and systems, for example, the YAHOO! Search Technology (YST). Additional real-time data collection, indexing and searches may be conducted to determine result sets {$URL_1$-$URL_M$} 504a-e for each search term in set {$k_1$-$k_N$} 502a-e. Processor 412 then retrieves L topmost URLs 604 for unbidded search term $k_U$ 416, as shown in FIG. 6. Variable L may range, for example, from 100 to 1,000 URLs. Similarly, additional real-time data collection, indexing and searches may be conducted to determine result set {$URL_1$-$URL_L$} 604. Result set {$URL_1$-$URL_L$} 604 may be determined using various methods and systems, such as for example, the YAHOO! Search Technology (YST).

The size of result sets {$URL_1$-$URL_M$} 504a-e and result set {$URL_1$-$URL_L$} 604 may be reduced by using various processing techniques, such as Latent Semantic Indexing or Probabilistic Latent Semantic Analysis.

Result sets {$URL_1$-$URL_M$} 504a-e and result set {$URL_1$-$URL_L$} 604 may be determined or retrieved using various techniques based on various ranking factors or various combination thereof. Such ranking factors may include a relevance score that is a function of the query itself and the type of document produced. Factors that affect the relevance score may include a static relevance score for the document such as link cardinality and page quality, placement of the search terms in the document, such as titles, metadata, and document web address, document rank, such as a number of external data records referring to the document and on how deeply a certain data record is embedded in the document, and document statistics such as query term frequency in the document, global term frequency, and term distances within the document. For example, Term Frequency Inverse Document Frequency (TFIDF) is a statistical technique that is suitable for ranking. The ranking increases proportionally to the number of times a word appears in the document but is offset by how common the word is in all of the documents in the collection.

Figure 7:
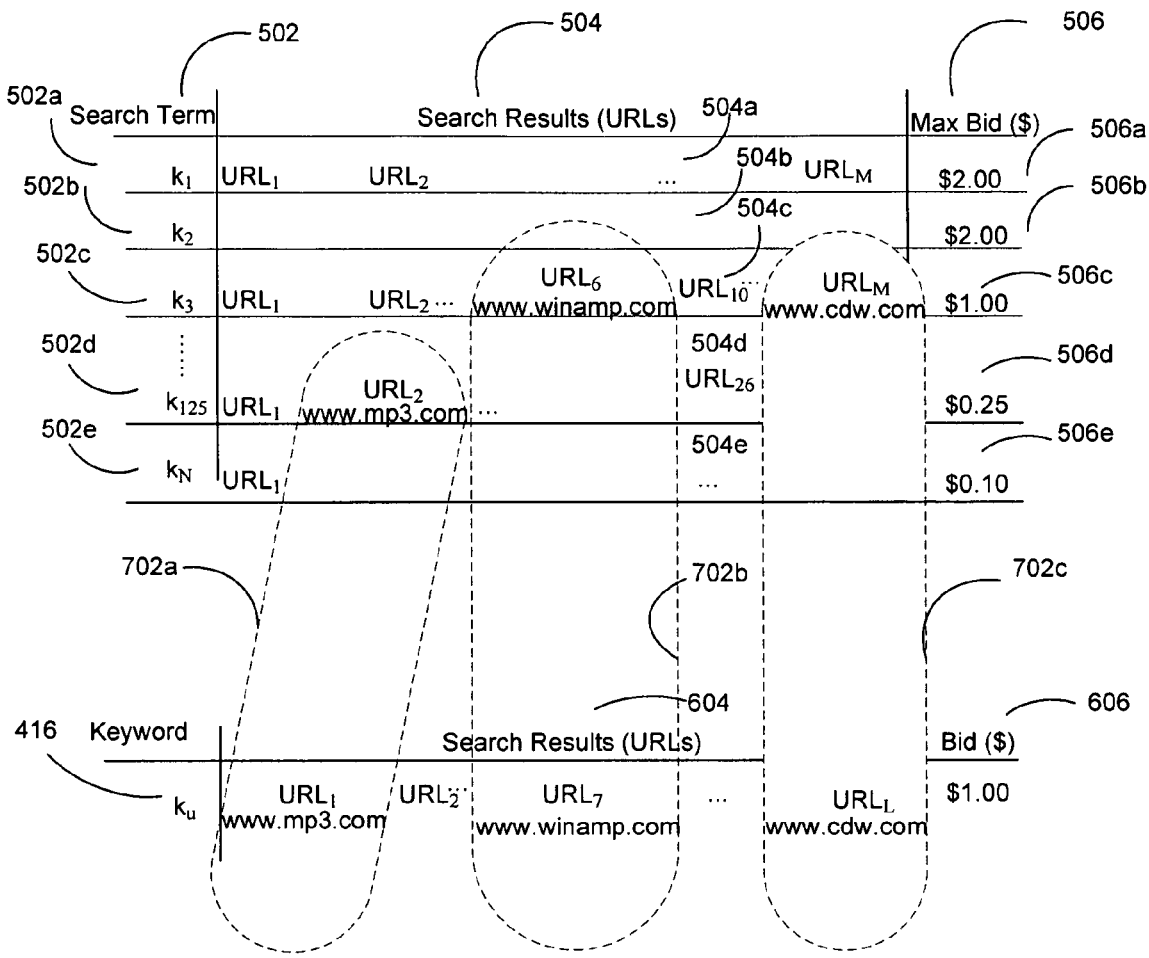
FIG. 7 is a table illustrating a comparison process in accordance with an embodiment of the invention.

As shown in FIG. 7, processor 412 compares each result set 504a-e with result set 604 to determine which bidded terms 502a-e are similar to unbidded term 416. Such comparison may be based on, for example, determining a respective similarity of each search result set {$URL_1$-$URL_M$} 504a-e to result set {$URL_1$-$URL_L$} 604. Determining a similarity between the URLs may be performed by matching the URL text strings, using ASCII character codes. Pairs 702a-c represent such matched up URLs.

To efficiently match URLs in result sets {$URL_1$-$URL_L$} 604 with URLs in result sets {$URL_1$-$URL_M$} 504a-e, system 400 may assign a unique binary or other numeric identifier to each URL stored in database 408. The use of such identifiers may help to reduce search space and correspondingly, the size of database 408. Processor 412 may then match such numeric identifiers. Alternatively, a hash function, for example, Message Digest Algorithm 5, may be used for mapping each URL in result sets {$URL_1$-$URL_L$} 604 and in result sets {$URL_1$-$URL_M$} 504a-e to a unique 128-bit number. After such URL hash numbers or codes are assigned to each URL, each URL hash code may be indexed by, for example, indexer 404 in the same way as words in documents are indexed. Processor 412 may then use any suitable technique, for example, TFIDF, to determine a similarity between the URLs in result sets {$URL_1$-$URL_L$} 604 and the URLs in result sets {$URL_1$-$URL_M$} 504a-e. The term frequency rates may be assigned by a function or based on historical click-through rates as described in detail below. The TFIDF scoring may also include such additional variables as a total search volume, value, or character length of query.

Processor 412 may also determine the similarity between the two sets of URLs by comparing the content of the documents that are identified by the URLs in result sets {$URL_1$-$URL_L$} 604 and {$URL_1$-$URL_M$} 504a-e. To effect such comparison, processor 412 may employ various information retrieval and processing techniques, for example, Latent Semantic Indexing or Probabilistic Latent Semantic Analysis, described elsewhere in this application.

The similarity between the two sets of URLs may also be determined as an intersection of the result sets over a union of the result sets. For example, $$\frac{|504a \cap 604|}{|504a \cup 604|}$$

Another technique for determining the similarity between the two sets of URLs is to assign a value to each URL based on the rank of the URL in its respective result set. For example, Term Frequency Inverse Document Frequency (TFIDF) is a statistical method that is suitable for ranking URLs. The ranking increases proportionally to the number of times an URL appears in the result set but is offset by how common the URL is in all of the result sets. For example, in result set {$URL_1$-$URL_M$} 504a-e, $URL_1$ with a highest rank may get a value of 10, $URL_2$ a value of 9, and $URL_M$ may get a value of 1. Similar value assignments may be performed for URLs in result set {$URL_1$-$URL_L$} 604. One may then multiply the value of each URL in each result set by a distance d between result sets {$URL_1$-$URL_M$} 504a-e and {$URL_1$-$URL_L$} 604. The URLs from result set {$URL_1$-$URL_M$} 504a-e, corresponding to the top n values may then be used to determine which bidded terms 502a-e are similar to unbidded term 416.

The distance d between two result sets may be determined, for example, using the following formula:

$$\frac{\sum [idf(ti)] \cdot [tf(x, ti)] \cdot [idf(ti)] \cdot [tf(y, ti)]}{\sqrt{\sum [idf(ti)] \cdot [tf(x, ti)] \cdot \sum [idf(ti)] \cdot tf(y, ti)]}}$$

where x and y are the result sets being compared, ti is the set of URLs in result sets {$URL_1$-$URL_M$} 504a-e and {$URL_1$-

$URL_L\}$ 604, tf is the term frequency and idf is the inverse document frequency for a particular URL.

Using the determined similarity between the two sets, system 400 may associate unbidded search term $k_U$ 416 with one or more of bidded search term in set $\{k_1-k_N\}$ 502*a-e* in any number of ways. In the example shown in FIG. 7, processor 412 associates unbidded search term $k_U$ 416 with bidded search terms $k_3$ 502*c* and $k_{125}$ 502*d*. Unbidded search term $k_U$ 416 may be associated with either bidded search term $k_3$ 502*c* or $k_{125}$ 502*d* or both. System 400 may additionally rank bidded search terms $k_3$ and $k_{125}$ based on any number of factors. System 400 may, for example, rank bidded search term $k_3$ 502*c* higher than $k_{125}$ 502*d* because result set $\{URL_1$-$URL_M\}$ 504*c* for $k_3$ 502*c* includes two matching pairs of URLs 702*b* and 702*c*, while result set $\{URL_1$-$URL_M\}$ 502*d* for $k_{125}$ 502*d* includes only one matching pair of URLs 702*a*.

System 400 may rank bidded search term $k_{125}$ 502*d* higher than bidded search term $k_3$ 502 based on URLs ranking. System 400 may associate unbidded search term $k_U$ 416 with bidded search term $k_{125}$ 502*d* because the matching URLs in matching pair 702*a* are ranked higher than the URLs in matching pairs 702*b-c*. For example, system 400 may assign a weight to each URL in result sets $\{URL_1$-$URL_L\}$ 604 and in result sets $\{URL_1$-$URL_M\}$ 504*a-e*. Such weights may be assigned, for example, based on actual click-through rates for each URL in result sets $\{URL_1$-$URL_L\}$ 604 and in result sets $\{URL_1$-$URL_M\}$ 504*a-e*. If, for example, the users who entered search term $k_3$ 502*c* consistently clicked on $URL_M$ more often than on $URL_6$ in result set $\{URL_1$-$URL_M\}$ 504*c*, $URL_M$ may be assigned a higher weight than $URL_6$. Similarly, if the users who conducted a search for a keyword $k_U$ 416, clicked more often on $URL_7$ in search results $\{URL_1$-$URL_L\}$ 604, a higher click-through rate, and correspondingly, a higher weight, may be assigned to $URL_7$ than to other URLs in search results $\{URL_1$-$URL_L\}$ 604. System 400 may collect various statistics, including, click-through rates for each URL associated with a term entered by the user. Such collected statistics may then be analyzed using any suitable statistical techniques, for example, regression analysis, to adjust ranking of URLs.

Alternatively, or in the absence of actual click-through rates, linear or logarithmic weights may be assigned to each URL in result sets $\{URL_1$-$URL_L\}$ 604 and in result sets $\{URL_1$-$URL_M\}$ 504*a-e*. Further still, various weights may be assigned to bidded search terms based on their respective ranking, which may depend on the frequency with which advertisers bid upon a particular term, the bid amount, or on the frequency with which the users request a particular term or a combination thereof. For example, system 400 may rank bidded search term $k_3$ higher than $k_{125}$ When associating unbidded search term $k_U$ 416 with bidded search terms $\{k_1$-$k_N\}$ 502*a-e*, processor 412 may employ any combination of weights assigned to each URL in result sets $\{URL_1$-$URL_L\}$ 604 and in result sets $\{URL_1$-$URL_M\}$ 504*a-e*.

Referring again to FIG. 9, system 400 may comprise bidding tool 420 used to price an unbidded search term based upon the determined similarity between the unbidded term and bidded terms. For example, bidding tool 420 may use the determined similarity between unpriced search term $k_U$ 416 and already priced search terms $k_3$ 502*c* and $k_{125}$ 502*d* to price search term $k_U$ 416. Bidding tool 420 may use both bidded terms $k_3$ and $k_{125}$ and their maximum bids 506*c* ($1.00) and 506*d* ($0.25), respectively, to compute a starting price 606 for unbidded search term $k_U$ 416. Additionally, various weighting coefficients may be used. Bidding tool 420 may also provide suggestions to advertisers of similar search terms, such as an unbidded term $k_U$ 416 to an advertiser that desires to bid on terms $k_3$ and $k_{125}$.

Thus, when a user performs a search on system 400, using a query including unbidded search term $k_U$ 416, system 400 will display sponsored results including either bidded search term $k_3$ 502*c* or bidded search term $k_{125}$ 502*d* or both, thereby increasing traffic to the advertisers websites and increasing revenues the operator of search engine 400 receives from the advertisers.

Figure 8:
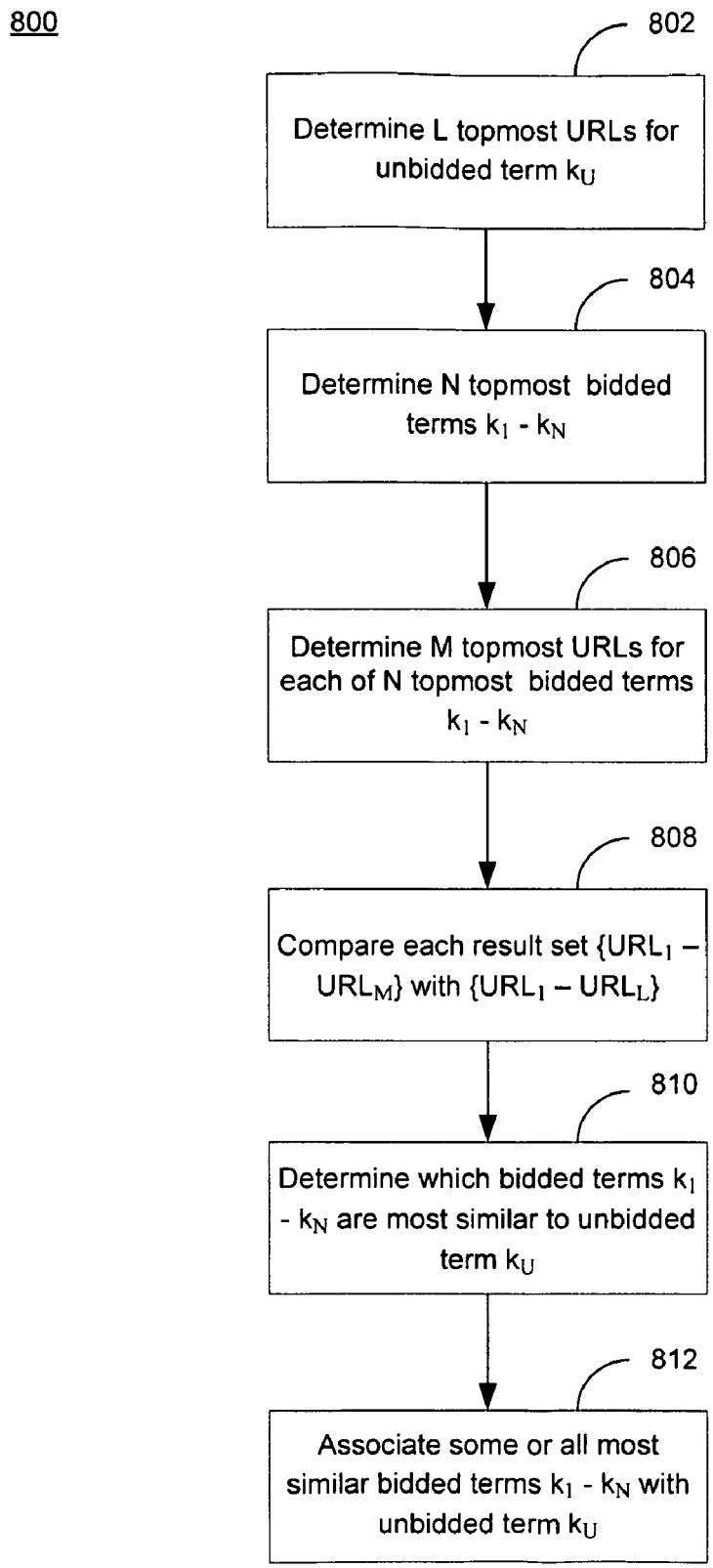
FIG. 8 is a flow chart illustrating a process for associating unbidded search terms with search terms already bid upon by advertisers in accordance with an embodiment of the invention.

Referring now to FIG. 8, a process 800 for associating an unbidded search term with search terms already bid upon by advertisers in accordance with an embodiment of the invention will be described. Process 800 could be used, for example with system 400 described herein. At 802, L topmost URLs for an unbidded search term $k_U$ are determined. Such L topmost URLs may be determined, for example, by using YAHOO! Search Technology (YST). Variable L may range, for example, from 100 to 1,000 URLs. At 804, N topmost search terms $k_1$-$k_N$ already bid upon by advertisers are determined. Such N topmost terms may be selected based upon various statistics, such as frequency with which advertisers bid upon a particular term, the bid amount, or the most searched for bidded terms. Variable N may range, for example, from 100,000 to 1,000,000 search terms. At 806, M topmost URLs for each of topmost N search terms $k_1$-$k_N$ are determined. Such M topmost URLs may be determined, for example, by using YAHOO! Search Technology (YST). Variable M may range, for example, from 100 to 1,000 URLs. At 808, M topmost URLs for each of topmost N search terms $k_1$-$k_N$ are compared with L topmost URLs for an unbidded search term $k_U$. The comparison could be performed by, for example, matching similar URLs or other techniques described herein. At 810, bidded terms $k_1$-$k_N$ that are most similar to unbidded term $k_U$ are determined. At 812, some or all bidded terms determined at 810 are associated with the unbidded term. Such association may be based on various weighting and ranking coefficients.

Referring now to FIG. 9, a process 900 for assigning a monetary value to a search term in accordance with an embodiment of the invention will be described. Process 900 could be used, for example with system 400 or system 1100 described herein. At 902, at least one first search term is provided to at least one advertiser or an advertiser account management server (not shown). As stated previously, the advertiser may include any physical or legal entity that arranges, either directly or indirectly, with the search engine operator or its representatives, for monetary value or otherwise, to have a commercial, a poster, a personal add, a classified add or any other kind of advertisement, to be delivered to the search engine user. The delivery may be effected through any type of communication channel, for example, telephone, mobile phone, SMS, radio, television, the Internet, LAN and WAN, or e-mail. Such At 904, bids from the users on the first term are received. At 906, a similarity function between the first search term and at least one second term is derived. Such similarity function may be, for example, represent a statistical relationship between the first term and the second term. A regression analysis, or any suitable statistical analysis, can be used to determine how similar the first and the second terms are. In some embodiments, the similarity function can be derived, for example, by using system 400 and process 800 described herein. At 908, a monetary value is assigned to the second term based at least in part on said bid and said similarity function.

Referring now to FIG. 10, a process 1000 for re-pricing a search term in accordance with an embodiment of the invention will be described. Process 1000 could be used, for example with bidding tool 420 implemented as part of system 400 or as a stand-alone system 1100 described herein. At 1002, at least one second search term, which was priced by using, for example, process 900 described herein, is provided to at least one user, such as an advertiser or an advertiser account management server (not shown). The user of process 1000 may be the same user from whom bids were received in process 900 or may be a different user. At 1004, at least one input associated with the second term is received. For example, such input may include various statistics, such as a frequency with which advertisers bid upon the second term, a bid amount, a statistical relationship between the original monetary value assigned to the second term and an actual average or median bid amount, a click-through rate for the second term, the amount of revenue generated by the second term, a statistical relationship between expected and actual revenue associated with the second term. Such input may be received from the user to whom the second search term is provided or from a system employed by the search engine operator, for example system 400 or system 1100 described herein. Alternatively or in addition, such input may include user-defined criteria, for example, various thresholds and weights. For example, linear weights and logarithmic weights. In some embodiments, such input is analyzed using any suitable statistical functions, for example, regression analysis.

Referring back to FIG. 10, at 1006, a similarity function, which was derived by using, for example, process 900 described herein, is adjusted based on input received at 1004 and optionally analyzed. Such adjustment includes, for example, changing regression coefficients used to determine an adjusted monetary value for the second term. In some embodiments, various foregoing weights are used to adjust the similarity function. At 1008, an adjusted monetary value is assigned to the second term. Process 1000 can be used recursively until either user-defined criteria are met. Such criteria may include various statistics, for example, standard deviation, denoting the accuracy of the originally assigned monetary value and the adjusted monetary value.

Figure 11:
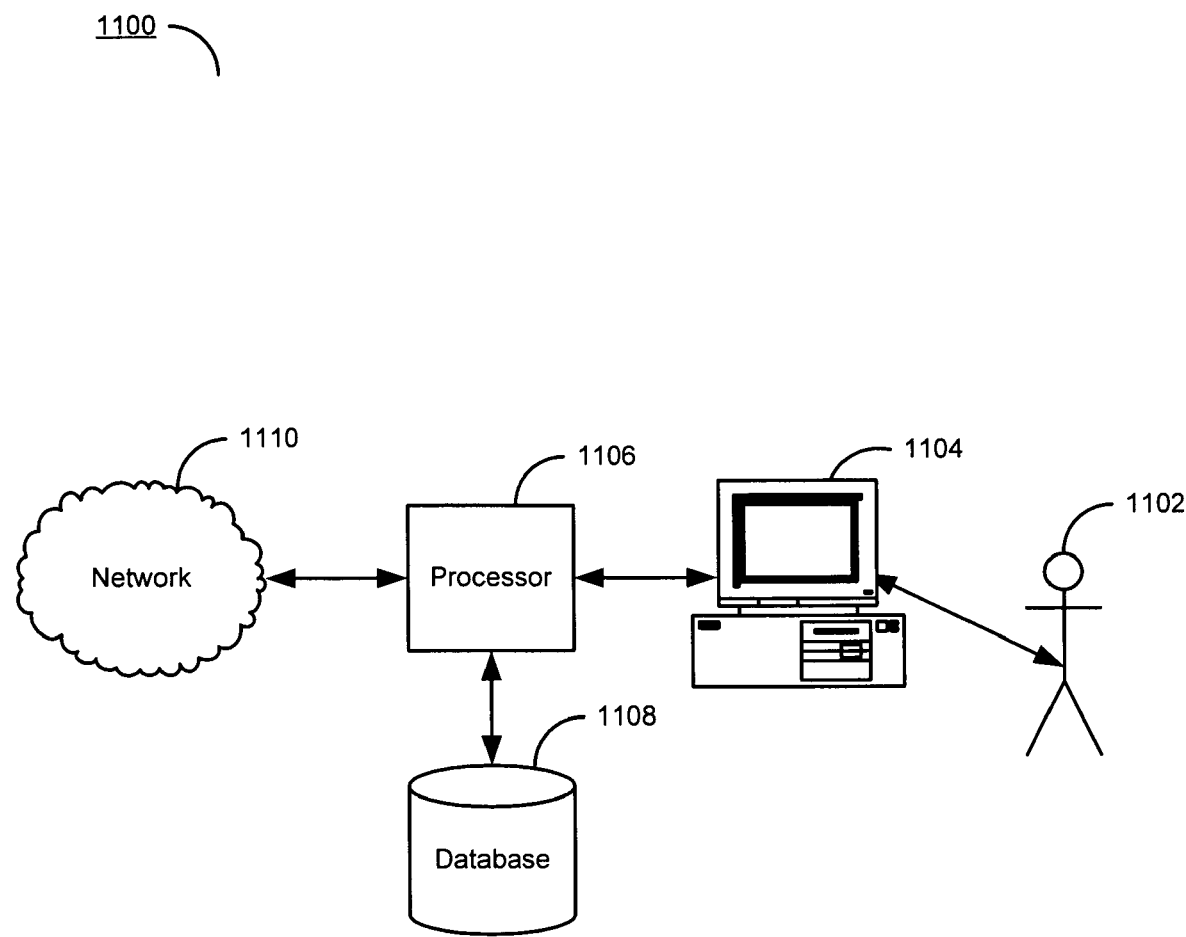
FIG. 11 is a system implementing a bidding tool in accordance with an embodiment of the invention.

As described above, system 400 may comprise bidding tool 420 used to price an unbidded search term based upon the determined similarity between the unbidded term and bidded terms. In some embodiments, bidding tool 420 may be implemented as a stand-alone system 1100 in FIG. 11. Referring now to FIG. 11, system 1100 comprises a computer interface 1104 effective to provide at least one first search term to a user 1102, a receiver effective to receive at least one bid from user 1102 on said first search term, which may be implemented as part of computer interface 1104, a processor 1106 connected to computer interface 1104 and effective to derive a similarity function between said first term and at least one second term and to assign a monetary value to said second term based at least in part on said bid and said similarity function. In some embodiments, system 1100 comprises a database 1108 for storing search terms, bids received from user 1102, assigned monetary values, adjusted monetary values, feedback input, as well as processing instructions, for example, instructions implementing methods 900 and 1000. If implemented as a stand-alone system, system 1100 may be located on the advertiser's server and download/upload data from a search engine operator via a network 1110.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

While the invention has been described and illustrated in connection with preferred embodiments, many variations and modifications as are to be evident to those of skill in the art may be made without departing from the spirit and scope of the invention, and the invention is thus not to be limited to the precise details of methodology or construction set forth above, as such variations and modifications are intended to be included within the scope of the invention. For example, in some embodiments, not only URLs and search terms, but any other data records may be associated with one another using the systems and methods disclosed herein. It is to be understood by those of ordinary skill in the art that the various data processing tasks described herein may be implemented in a wide variety of ways, many of which are known and many more of which are doubtless to be hereafter developed. For example, a wide variety of computer programs and languages are now known, and are likely to be developed, which are suitable for storing, retrieving, and processing data, as well as for searching, indexing, and comparing search results and other tasks disclosed herein. Furthermore, a wide variety of media are now known, and are likely to be developed, which are suitable for transmitting data records, searching, indexing, and comparing search results and other tasks disclosed herein. Still further, the systems and methods of the present invention may be implemented using any suitable centralized or distributed computer hardware and/or software in various combinations. Except to the extent necessary or inherent in the processes themselves, no particular order to steps or stages of methods or processes described in this disclosure, including the figures, is implied.

What is claimed is:

1. A computerized method for associating an unbidded keyword with a bidded keyword in managing sponsored search listings, the method comprising:

electronically selecting a first set of search engine results for the unbidded keyword;

electronically selecting a second set of search engine results for the bidded keyword, the second set being distinct from the first set;

comparing, using a processing device, the first set with the second set;

associating, using the processing device, the unbidded keyword with the bidded keyword based on the comparing; and electronically assigning in managing sponsored search listings, a first monetary value to the unbidded keyword based on a second monetary value for the bidded keyword associated with the unbidded keyword.

2. The method of claim 1, wherein the bidded keyword is associated with an advertisement paid for by an advertiser.

3. The method of claim 2, wherein the unbidded keyword is received from a user.

4. The method of claim 3, further comprising communicating the advertisement associated with the bidded keyword to the user in response to the receiving the unbidded keyword from the user.

5. The method of claim 4, further comprising charging the first monetary value to the advertiser.

6. The method of claim 1, wherein each search engine result in the first and second sets of search engine results includes a uniform resource locator.

7. The method of claim 6, wherein the comparing the first set with the second set includes comparing the respective uniform resource locators.

8. The method of claim 1, further comprising:
assigning a respective identifier to each result in the first and second sets of search engine results; and wherein
the comparing of the first and second sets includes comparing the respective identifiers.

9. The method of claim 8, further comprising:
generating an index of the identifiers; and wherein
the comparing of the first and second sets includes using a search engine to search the index.

10. The method of claim 9, wherein the comparing of the first and second sets includes comparing the respective documents.

11. The method of claim 1, wherein each search engine result in the first and second sets identifies a respective document.

12. The method of claim 1, wherein comparing said first and second sets includes using a statistical method.

13. The method of claim 12, wherein said statistical method includes a term frequency inverse document frequency method.

14. The method of claim 1, further comprising ranking the search engine results in at least one of the first and second sets.

15. The method of claim 14, wherein associating the unbidded and the bidded keywords comprises associating the unbidded and bidded keywords based on the ranking.

16. The method of claim 15, wherein the ranking is based on click-through rates.

17. The method of claim 16, wherein the ranking is based on linear weights.

18. The method of claim 15, wherein the ranking is based on logarithmic weights.

19. The method of claim 15, wherein said ranking includes using a statistical method.

20. The method of claim 19, wherein said statistical method includes a term frequency inverse document frequency method.

21. A computerized method for associating an unbidded keyword with a first bidded keyword and a second bidded keyword in managing sponsored search listings, the method comprising:
electronically selecting a first set of search engine results for the unbidded keyword;
electronically selecting a second set of search engine results for the first bidded keyword, the second set being distinct from the first set;
electronically selecting a third set of search engine results for the second bidded keyword;
comparing, using a processing device, the first set with the second set;
comparing, using the processing device the first set with the third set;
associating the unbidded keyword with the first bidded keyword based on the comparing the first set with the second set;
associating the unbidded keyword with the second bidded keyword based on the comparing the first set with the third set; and
electronically assigning in managing sponsored search listings, a first monetary value to the unbidded keyword based on a second monetary value for the first bidded keyword associated with the unbidded keyword and a third monetary value for the second bidded keyword associated with the unbidded keyword.

22. A system for associating an unbidded keyword with a bidded keyword in managing sponsored search listings, the system comprising:
a crawler effective to collect data records from an information source;
a data store connected to the crawler and effective to store the data records;
an indexer connected to the data store and effective to index the data records stored in the data store to produce indexed data records;
a search node effective to search the indexed data records;
a receiver effective to receive a query with the unbidded keyword;
a processor connected to the receiver and the search node and effective to process the query and to associate the unbidded keyword with a bidded keyword; and
a bidding tool operative to assign in managing sponsored search listings, a monetary value to the unbidded keyword based on the monetary value for the bidded keyword associated with the unbidded keyword.

23. A computer readable medium including computer executable instructions stored thereon for associating an unbidded keyword with a bidded keyword in managing sponsored search listings, the instructions comprising:
selecting a first set of search engine results for the unbidded keyword;
selecting a second set of search engine results for the bidded keyword, the second set being distinct from the first set;
comparing the first set with the second set;
associating the unbidded keyword with the bidded keyword based on the comparing; and
assigning in managing sponsored search listings, a first monetary value to the unbidded keyword based on a second monetary value for the bidded keyword associated with the unbidded keyword.

* * * * *